United States Patent
Varakin et al.

(10) Patent No.: US 11,138,234 B2
(45) Date of Patent: Oct. 5, 2021

(54) SYSTEM AND A METHOD FOR EXECUTING SQL-LIKE QUERIES WITH ADD-ON ACCELERATORS

(71) Applicant: SQREAM TECHNOLOGIES LTD, Ramat Gan (IL)

(72) Inventors: Kostya Varakin, Haifa (IL); Ami Gal, Kfar HaOranim (IL)

(73) Assignee: Sqream Technologies Ltd., Tel Aviv (IL)

( * ) Notice: Subject to any disclaimer, the term of this patent is extended or adjusted under 35 U.S.C. 154(b) by 670 days.

(21) Appl. No.: 14/432,370

(22) PCT Filed: Sep. 24, 2013

(86) PCT No.: PCT/IL2013/050802
§ 371 (c)(1),
(2) Date: Mar. 30, 2015

(87) PCT Pub. No.: WO2014/049596
PCT Pub. Date: Apr. 3, 2014

(65) Prior Publication Data
US 2015/0242487 A1    Aug. 27, 2015

Related U.S. Application Data

(60) Provisional application No. 61/707,019, filed on Sep. 28, 2012.

(51) Int. Cl.
*G06F 16/907* (2019.01)
*G06F 16/28* (2019.01)
(Continued)

(52) U.S. Cl.
CPC ........ *G06F 16/285* (2019.01); *G06F 12/0802* (2013.01); *G06F 16/1858* (2019.01);
(Continued)

(58) Field of Classification Search
CPC ............ G06F 17/30598; G06F 16/907; G06F 16/24547; G06F 16/24569; G06F 16/2456;
(Continued)

(56) References Cited

U.S. PATENT DOCUMENTS

2005/0091183 A1 * 4/2005 Cunningham ...... G06F 16/2246
2005/0209988 A1 * 9/2005 Cunningham .... G06F 16/24547
(Continued)

FOREIGN PATENT DOCUMENTS

WO    WO 2012025915 A1 * 3/2012 ........... G06F 9/5072
WO    WO-2012025915 A1 * 3/2012 ........... G06F 9/5072
(Continued)

OTHER PUBLICATIONS

Breb et al., "A framework for cost based optimization of hybrid CPU/GPU query plans in database systems", Jan. 2012, Control and Cybernetics 41(4):715-742 (Year: 2012).*
Vasudevan, V. R. Energy-Efficient Data-intensive Computing with a Fast Array of Wimpy Nodes. PhD thesis, Carnegie Mellon University, Oct. 2011.
Wei Dong, Fred Douglis, Kai Li, Hugo Patterson, Sazzala Reddy, Philip Shilane, Tradeoffs in scalable data routing for deduplication clusters, Proceedings of the 9th USENIX conference on File and stroage technologies, pp. 1-15, Feb. 2011, San Jose, California.
Zhiyuan Chen, Building compressed database Systems, A Dissertation Presented to the Faculty of the Graduate School of Cornell University, Aug. 1, 2002, pp. 1-165.
(Continued)

*Primary Examiner* — Hosain T Alam
*Assistant Examiner* — Robert F May
(74) *Attorney, Agent, or Firm* — Browdy and Neimark, P.L.L.C.

(57) ABSTRACT

According to some embodiments is disclosed a method for controlling and scheduling operation of at least one SQL operator on data chunk. The method comprising the step of: receiving SQL query, accessing data chunk blocks, receive meta data statistics and SQL query, analyzing the query selectivity, result size and Frequency moments calculation during the query execution run-time and choosing the right device to execute the each operator of the query according to analysis and predict results size.

18 Claims, 9 Drawing Sheets

(51) Int. Cl.
  *G06F 16/56* (2019.01)
  *G06F 16/18* (2019.01)
  *G06F 16/2455* (2019.01)
  *G06F 16/9535* (2019.01)
  *G06F 16/2453* (2019.01)
  *G06F 16/245* (2019.01)
  *G06F 12/0802* (2016.01)

(52) U.S. Cl.
  CPC ...... *G06F 16/2453* (2019.01); *G06F 16/2456* (2019.01); *G06F 16/24547* (2019.01); *G06F 16/24569* (2019.01); *G06F 16/56* (2019.01); *G06F 16/907* (2019.01); *G06F 16/9535* (2019.01); *G06F 2212/1021* (2013.01); *G06F 2212/152* (2013.01); *G06F 2212/163* (2013.01); *G06F 2212/608* (2013.01)

(58) Field of Classification Search
  CPC ............. G06F 16/9535; G06F 16/1858; G06F 16/2453; G06F 16/56; G06F 12/0802; G06F 2212/1021; G06F 2212/152; G06F 2212/163; G06F 2212/608; G06F 16/285
  USPC ........................................................ 707/616
  See application file for complete search history.

(56) References Cited

U.S. PATENT DOCUMENTS

2007/0022136 A1* 1/2007 Keller ............... G06F 16/24545
2007/0143248 A1* 6/2007 Uppala ............... G06F 16/2453
2009/0018992 A1* 1/2009 Zuzarte ............... G06F 16/2453

FOREIGN PATENT DOCUMENTS

WO  2012091948 A  7/2012
WO  2012142186 A  10/2012

OTHER PUBLICATIONS

David Woodruff, Frequency Moments, Jan. 1, 2009, pp. 1169-1170.
Banchong Harangsri, Query result Size estimation techniques in database systems, A dissertation submitted to the University of New South Wales School of Computer Science and Engineering, Apr. 1998.
Sebastian BreB et al: "A framework for coast based optimization of hybrid CPU/GPU query plans in database systems" Control and Cypernetics, vol. 41, No. 4 pp. 715-742. (2012.).

* cited by examiner

SYSTEM AND A METHOD FOR EXECUTING SQL-LIKE QUERIES WITH ADD-ON ACCELERATORS

BACKGROUND

1. Technical Field

The present invention relates generally a method for scheduling the execution of SQL basic operators.

2. Prior Art

In prior art the major point of scheduling tasks on heterogeneous systems was in predicting run time and/or maximizing throughput of the system.

BRIEF SUMMARY

According to some embodiments of the present invention is disclosed a method for controlling and scheduling operation of at least one SQL operator on data chunk. The method comprising the step of: receiving SQL query, accessing data chunk blocks, receive meta data statistics and SQL query, analyzing the query selectivity, result size Frequency moments calculation during the query execution run-time and choosing the right device to execute the each operator of the query according to analysis and predict results size. According to some embodiments of the present invention is disclosed a method for controlling and scheduling operation of at least one SQL operator on data chunk using multiple execution units including HWA and CPU units. The method comprising the step of: receiving SQL query, accessing data chunk blocks, receive meta data statistics of the data chunk blocks, divide data chunk into logic units by assigning splitters based on meta data analysis, analyzing the received metadata for predicting the query selectivity and result size during the query execution run-time and choosing at least one HWA device to execute each operator of the query based on its resources according said analysis including predicted results size and the calculated.

According to some embodiments of the present invention the method further comprising the step of setting markers according identified physical boundaries based on data traversing through sorting phase for calculating number of data elements which are required for executing the received query, wherein choosing the at least HWA further includes checking the calculated number of data elements required for the each query.

According to some embodiments of the present invention the analyzing query further includes frequency moments calculation.

According to some embodiments of the present invention the method further comprising the step of combining data read and write operations of received query to determine the schedule of operations for enabling sequential data access to the data chunks based on identified markers based on pattern image of operation vector architecture.

According to some embodiments of the present invention the metadata is analyzed by HWA device by scanning and filtering the metadata by multiple threads simultaneously enabling optimized management of the storage access.

According to some embodiments of the present invention the method of claim wherein the metadata analysis include at least one of: bloom fitter, checking chunk boundaries or Frequency moments calculations.

According to some embodiments of the present invention the decompression process and the query execution are performed by the same chosen execution unit.

According to some embodiments of the present invention the method further comprising the step of grouping logical data chunks based on identified markers to enable merging or join operation of multiple logical groups to be applied simultaneously by multiple threads of at least one HWA execution device.

According to some embodiments of the present invention the method further comprising the step of applying data insert operation utilizing the physical address identified by the markers. According to some embodiments of the present invention the results of a first query operation are provided to next query operation in the query pipe line before the first query execution has ended, based on combined splitters and markers data, wherein query operation are executed in parallel processing.

According to some embodiments of the present invention the first operation is filtering and the next operation is sorting, wherein the filtering and sorting operation are combined in real time, the filter output the result with assigned splitters are provide to the sort operation enabling to start the sorting stage while the flittering process is still working, not waiting for all results to come from filtering stage.

According to some embodiments of the present invention the method further comprising the step of mapping all cache blocks to OS pages addresses to eliminate overlapping between the blocks.

According to some embodiments of the present invention wherein the caching information is stored in HWA on-board memory for optimizing cache management including calculating statistics for cache replacement policies.

According to some embodiments of the present invention the method further comprising the step of generating binary tree structure of addresses stored in cache, for enabling to split cache information to chunks, ensuring each chunk is stored in on-board RAM entirely.

According to some embodiments of the present invention the method further comprising the step of maintaining query predicates in separated cache in the HWA on-board memory for improving hit/miss ratio, wherein only identified query predicates that returned true value for each storage block are cached.

According to some embodiments of the present invention is disclosed a system for controlling and scheduling operation of at least one SQL operator on data chunk using multiple execution units including HWA and CPU units. The system comprised of: metadata analyzer for analyzing data chunk blocks and creating meta data thereof, splitter module divide data chunk into logic units by assigning splitters based on meta data, sorting module for setting markers according identified physical boundaries based on data traversing through sorting phase for calculating number of data elements of required for executing query and scheduling module for analyzing the query selectivity and result size during the query execution run-time and choosing at least one execution device to execute each operator of the query based on its resources according said analysis and defined markers including predicted results size and the calculated number of data elements required for the query.

According to some embodiments of the present invention the analyzing query further includes frequency moments calculation.

According to some embodiments of the present invention the scheduling module combines data read and write operations of received query to determine the schedule of operations for enabling sequential data access to the data chunks based on identified markers based on pattern image of operation vector architecture.

According to some embodiments of the present invention the metadata is analyzed by HWA device by scanning and filtering the metadata by multiple threads simultaneously enabling optimized management of the storage access.

According to some embodiments of the present invention the metadata analysis includes at least one of: bloom fitter, checking chunk boundaries or Frequency moments calculations.

According to some embodiments of the present invention the decompression process and the query execution are performed by the same chosen execution unit.

According to some embodiments of the present invention the system further comprising a join/merge module for grouping logical data chunks based on identified markers to enable merging or join operation of multiple logical groups to be applied simultaneously by multiple threads of at least one HWA execution device.

According to some embodiments of the present invention the system further comprising inserting module for applying data insert operation utilizing the physical address identified by the markers.

According to some embodiments of the present invention the results of a first query operation are provided to next query operation in the query pipe line before the first query execution has ended, based on combined splitters and markers data, wherein query operation are executed in parallel processing.

According to some embodiments of the present invention the first operation is filtering and the next operation is sorting, wherein the filtering and sorting operation are combined in real time, the filter output the result with assigned splitters are provide to the sort operation enabling to start the sorting stage while the flittering process is still working, not waiting for all results to come from filtering stage.

According to some embodiments of the present invention the system further comprising a caching module for mapping all cache blocks to OS pages addresses to eliminate overlapping between the blocks.

According to some embodiments of the present invention the system further comprising a cashing module wherein the caching information is stored in HWA on-board memory for optimizing cache management including calculating statistics for cache replacement policies.

According to some embodiments of the present invention the system further comprising a cashing module for generating binary tree structure of addresses stored in cache, for enabling to split cache information to chunks, ensuring each chunk is stored in on-board RAM entirely.

According to some embodiments of the present invention the system further comprising a cashing module for maintaining query predicates in separated cache in the HWA on-board memory for improving hit/miss ratio, wherein only identified query predicates that returned true value for each storage block are cached These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
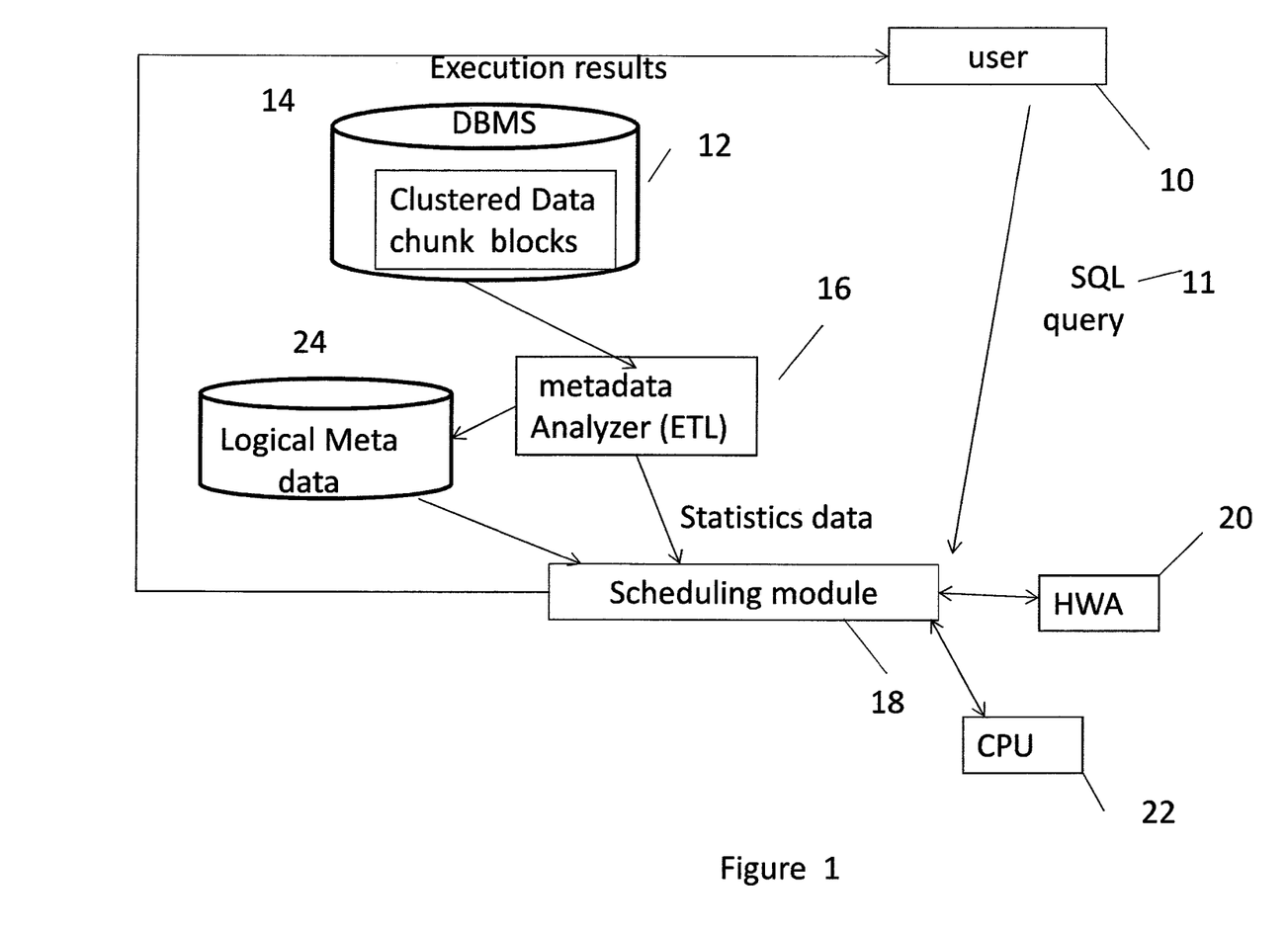
FIG. 1 illustrates a block diagram showing the entities and modules involved in processing user SQL query on data chunks, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The present invention discloses a system and method for scheduling an execution of SQL-like operators on heterogeneous system combined from CPUs, GPUs or MICs. Usually heterogeneous system is consisted from one or more CPU cores that have latency oriented machines and one or more accelerators (GPUs and/or MICs and/or FPGAs). The latest are throughput oriented machines that have many cores and are able to run much more threads simultaneously. The present invention suggest to use the compression schemes and prediction algorithms on prepared metadata for controlling and scheduling the execution of various operators of any SQL-like language on CPUs or accelerators FIG. 1 illustrates a block diagram showing the entities and modules involved in processing user SQL query on data chunks, according to some embodiments of the invention. A user 10 initiates an SQL query (11), which is sent to the Scheduling module (18). The Scheduling module run at least one operator of the query on Data chunk blocks stored on the DBMS using HWA (20) or CPU based on statistics analysis received from metadata Analyzer 16a optionally stored in logical metadata database 24.

Figure 2:
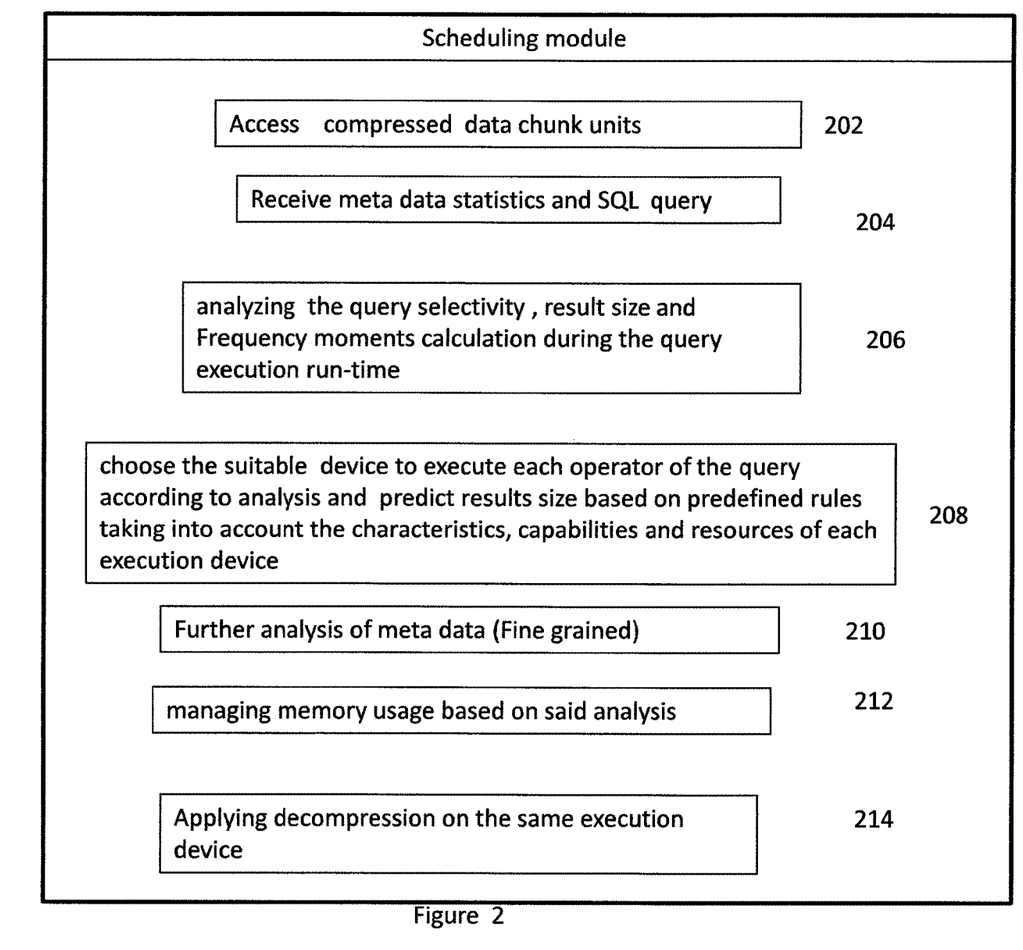
FIG. 2 is a flow diagram Scheduling module processing, according to some embodiments of the invention.

By estimating the result set size of the input data stream and offloading the calculation to accelerators we can use memory more effectively FIG. 2 is a flow diagram Scheduling module processing, according to some embodiments of the invention. The module access multiple data chunk blocks stored on a DBRM (202) and receive meta data statistics and requested SQL query (204). At the next step the query operators are analyzed based on former statistics to predict the following parameters: query selectivity (the number of results which are expected to match the query, a query is "more selective"

when it is expected to match with more data elements and vice versa.), result size and Frequency moments (number of times an element appears in the result data calculation during the query execution run-time) (206). Based on said predicted parameters is selected the more suitable device to execute each operator of the query (208) based on predefined rules taking into account the characteristics, capabilities and resources of each execution device. This scheduling of the execution device based on predicted parameters, maximize memory usage and reduce the memory allocating overhead.

According to some embodiments of the present invention, the selection of the at least suitable HWA further includes checking the calculated number of data elements required for the each query. The calculation of number of data elements which are required for executing the received query are based on setting markers according identified physical boundaries based on data traversing through sorting phase as further described bellow.

Statistical measurements show that extremely low or high selectivity operators are better to be executed on CPU without accelerators usage. Decompression operator must be executed together with SQL operator on one execution unit to minimize data transfer.

Optionally further analysis of metadata (Fine grained) is applied on the data chunks to optimize the HWA usage (210). The fine grain includes scanning and filtering the metadata by many threads simultaneously enabling optimized management of the storage access (212). For further optimizing HWA and CPU usage the decompression process is performed by the same execution unit (HWA or CPU) device (214).

Figure 3:
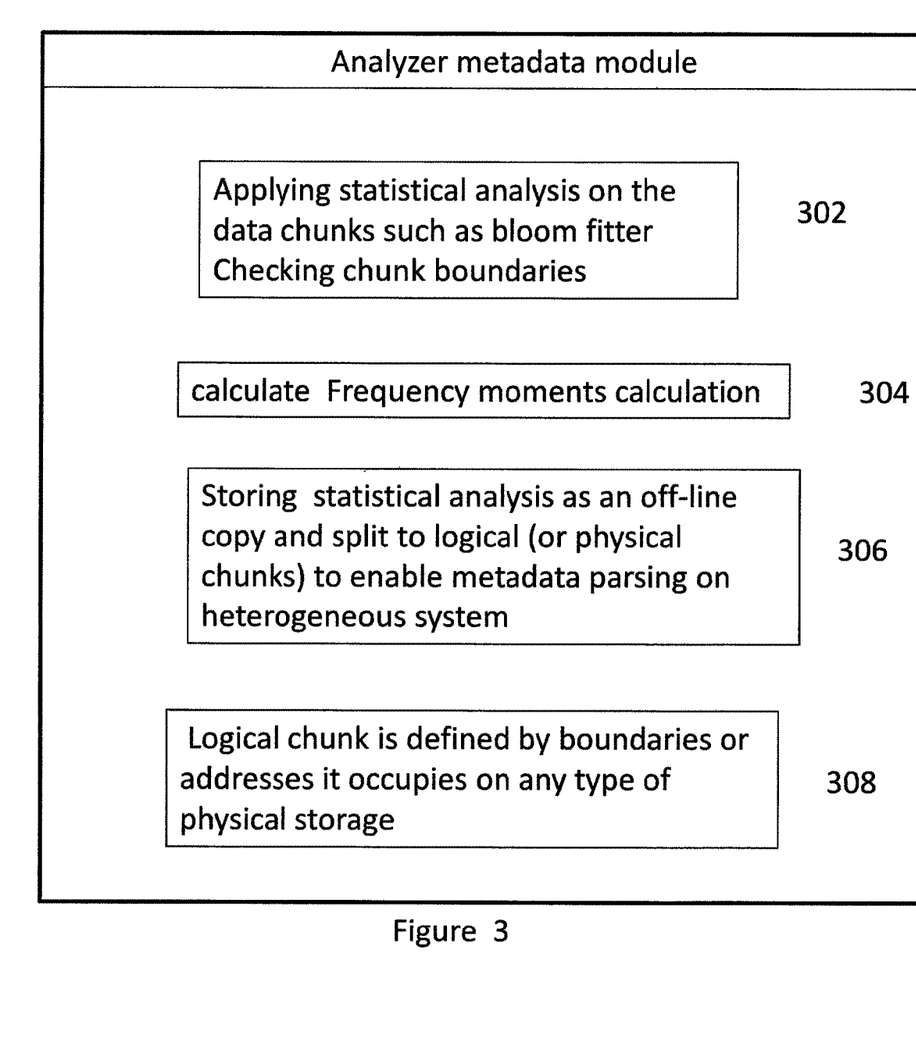
FIG. 3 is a flow diagram of the analyzer metadata processing, according to some embodiments of the invention.

FIG. 3 is a flow diagram of the analyzer metadata processing, according to some embodiments of the invention. At the first step of the analysis, are applied statistical analyses on the data chunks such as bloom fitter or checking chunk boundaries (302) which represent data statistical properties and not the data itself. At the next step are preformed calculation for predicting Frequency moments calculations (304). All analysis and calculation are stored as an off-line copy and are splitting data elements to logical or physical chunks, enabling metadata parsing on heterogeneous system (306). The Logical chunks are defined by boundaries or addresses and can be saved at different types of physical storage mediums. The data could be stored in native format (e.g inside RDBMS or NoSQL) and not after ETL process. The statistics may be updated periodically.

Figure 4:
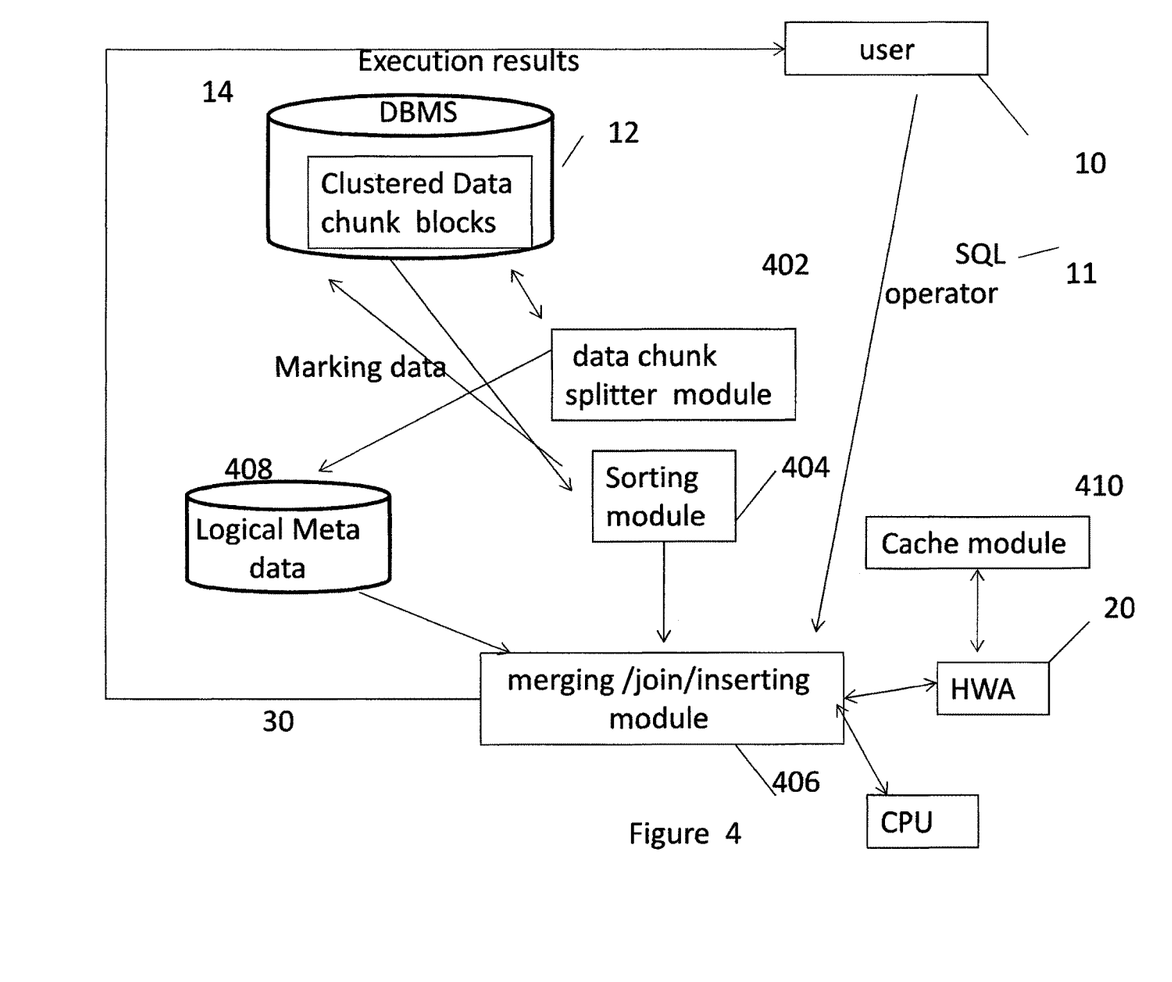
FIG. 4 illustrates a block diagram showing the entities and modules involved in processing user SQL query on data chunks, according to some embodiments of the invention.

FIG. 4 illustrates a block diagram showing the entities and modules involved in processing user SQL query on data chunks, according to some embodiments of the invention. A user 10 initiates an SQL query (11), which is sent to the SQL operator module (406). The SQL operator module run at least one operator of the query on data chunk blocks stored on the DBMS using HWA (20) or CPU based on logical metadata stored in logical metadata database 408 based on processing of the data chunk splitter module (402) and sorting module (404).

Overall data structure: data is stored in chunks (logical or physical) and each chunk has a metadata consisting of splitters. Important property of the splitters is that they are derived from global data set (e.g. during ETL process), thus each data chunk has its own set of splitters derived from global set of splitters. Markers are not attached to chunk metadata and created while working with data. The major benefit of using splitters on super-scalar architecture is fine-grained view of data.

According to some embodiments it is suggested to apply cache optimization module 410 for managing cache data at the in HWA on-board memory.

Figure 5:
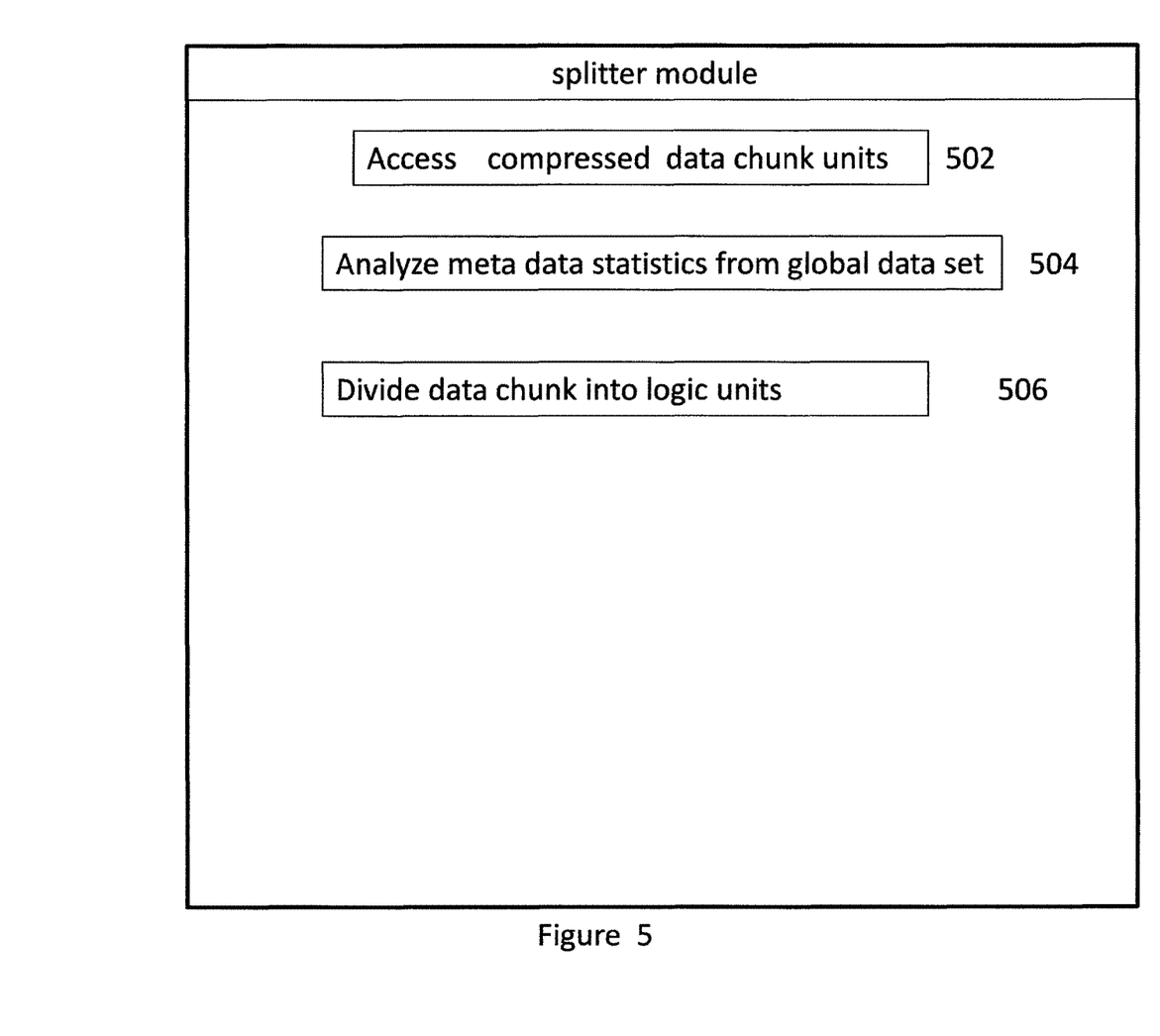
FIG. 5 is a flow diagram of the splitter module processing, according to some embodiments of the invention.

FIG. 5 is a flow diagram of the splitter module processing, according to some embodiments of the invention. At the first step, the module access the data chunk units during ETL processing (502). At the next step are preformed metadata statistics analyses from global data set of the data chunks (504). Based on said analysis the data chunks are divided into logic units (506).

Figure 6:
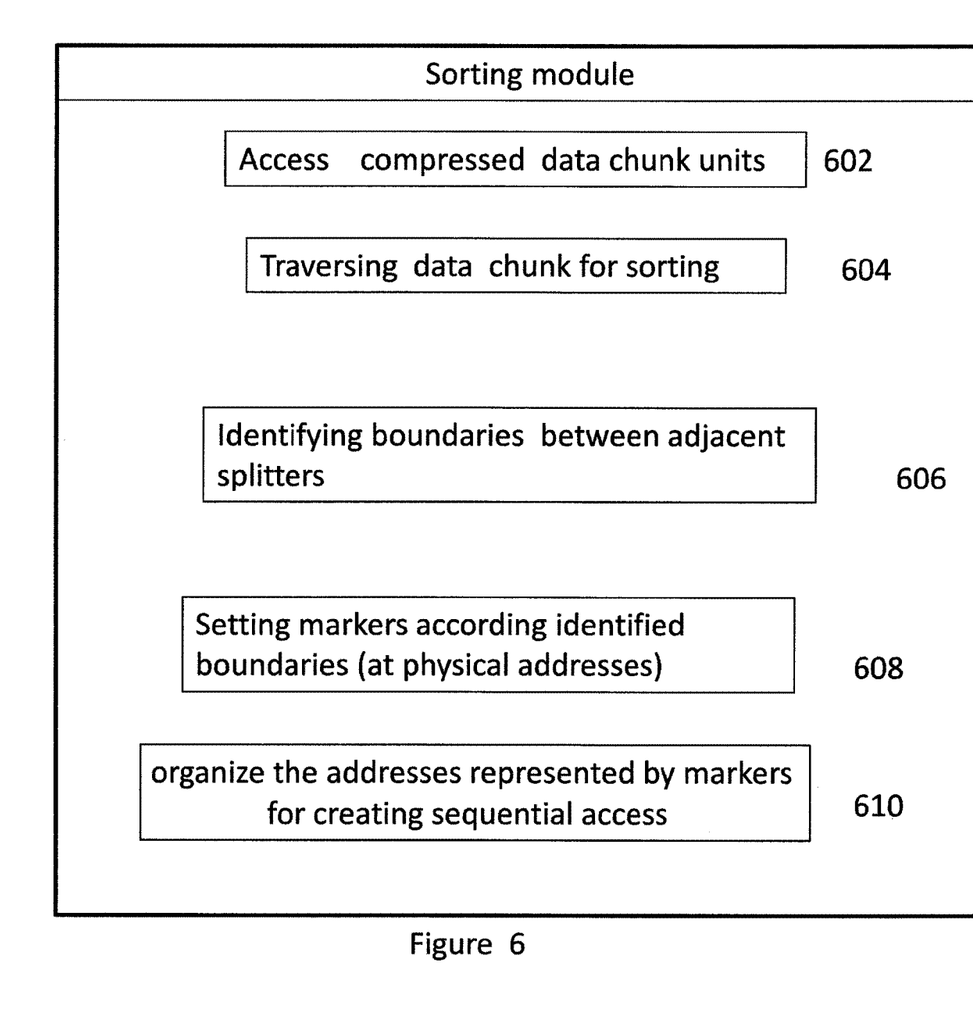
FIG. 6 is a flow diagram of the sorting module processing according to some embodiments of the invention.

FIG. 6 is a flow diagram of the sorting module processing according to some embodiments of the invention.

At the first step the module accesses the data chunk units during ETL processing or in run time (602). At the next step the data chunks are traversed for performing sort operation (604). During the sort operation are identified (606) boundaries between adjacent splitters. At the next step are defined markers setting according identified boundaries at physical addresses (608). According to further implementations of the present invention the addresses represented by markers are organized for to enable sequential access (610).

Figure 7:
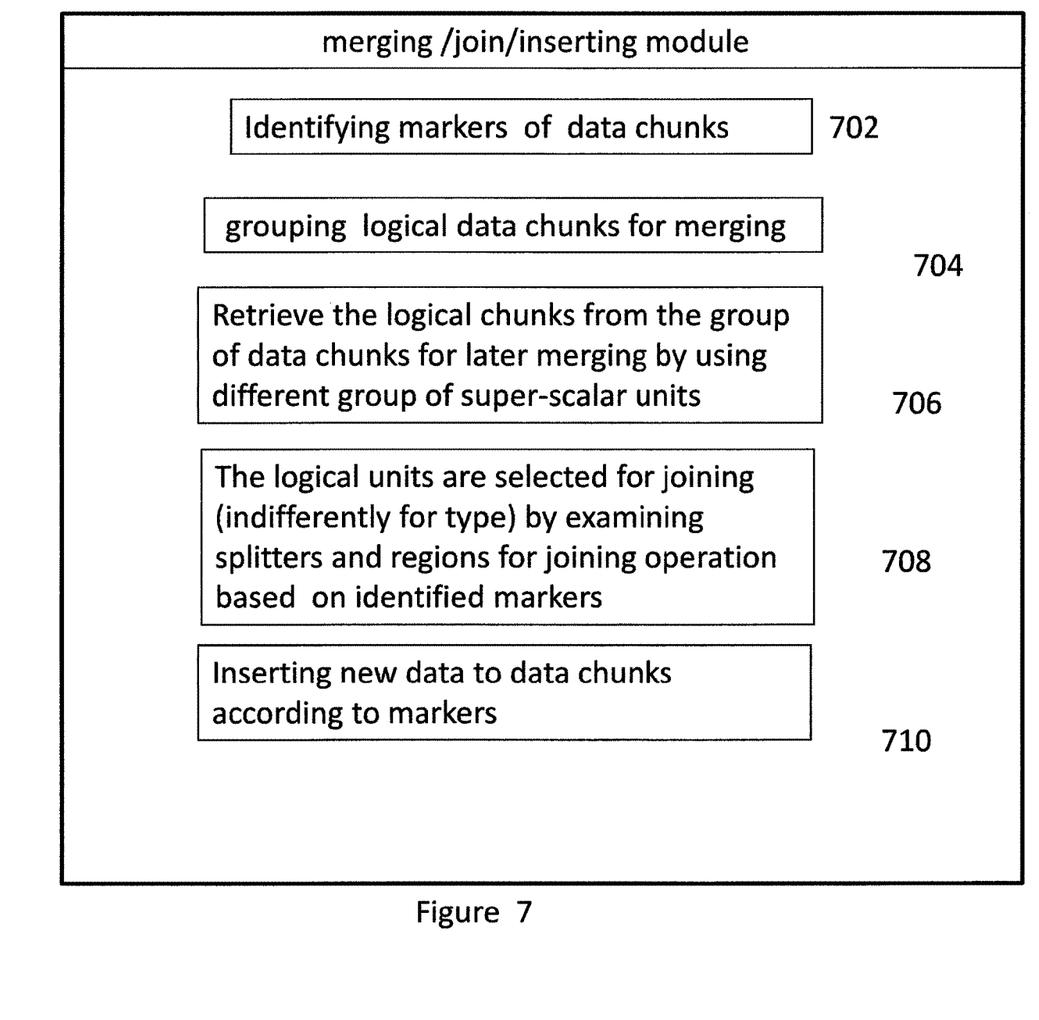
FIG. 7 is a flow diagram of the SQL operator module processing, according to some embodiments of the invention.

FIG. 7 is a flow diagram of the SQL operator module processing, according to some embodiments of the invention.

At the first step are identified markers of data chunks during run time (702). At the next step are grouped logical data chunks based on the identified markers (704). For later merging operation are retrieved the logical chunks from the group of data chunks using different group of super-scalar units, such as such as WARP in GPU (706). For later joining operation, logical units are selected in parallel processing (indifferently for type) by examining splitters and regions based on identified markers (708). The insertion of new data to data chunks is based on the sequential access organization represented by the markers addresses (710). According to further embodiments of the present invention, it is suggested to combine the use of splitters and markers to provide results for the next steps in pipelined SQL query execution. For example: a filter operation on the data is followed by sorting the result of filtering and a merging operation. In this case it is suggested to filter and output the result with splitters assigned, and start the sorting stage while the flittering process is still working, not waiting for all results to come from filtering stage. While sorting process takes place and markers are assigned, the last merge section processing can start to execute immediately upon arrive of first chunk since markers are already assigned.

The usage of splitters in sort operation: through the sorting process, that data in specific chunk may be grouped between given splitters. During the chunk sorting process the splitters metadata is not being used, but markers are set up to point on boundaries between adjacent splitters. After the markers are set the data chunk divided logically by the splitters and each splitter position (address) is marked by an assigned unique marker.

The usage of splitters in Merge operation: through the merging process of two data chunks the boundaries of data between two adjacent splitters are known, as during the sorting process the markers are assigned to point at the logical boundaries. Hence, such merging processing is suited to be executed by superscalar processor for preparing groups of logical data chunks for merging. Each unit in super-scalar architecture is assigned to pick the logical chunks (logical boundaries are marked by the markers) from the group of data chunks for later merging by possibly different group of super-scalar units The usage of splitters in Join operation: each type of join (inner or outer) can benefit from splitters/markers metadata. Similar to merging process the candidates for atomic join of logical units of data are picked up in parallel manner by super-scalar units. The logical units are selected for joining (indifferently for type) by examining splitters and regions for work (joining) are marked by markers. This method allows parallelizing the computational load efficiently.

The usage of splitters in data inserting process: assuming the data was already sorted, we can use the defined markers to find the respective logical block for data insertion based on defined splitters.

Markers:

The usage of markers in Merge operation: markers allow picking the exact logical block for merging. It is suggested according to the present to use the markers on super-scalar architecture for organizing the addresses represented by markers for sequential access since markers could be directly mapped to addresses in underlying storage system. The organizing markers on super-scalar architecture is more efficient using minimum computational resources, enabling a very fine-grained access running a multiple threads in parallel and working on each logical data chunk separately The usage of markers in Join operation: the role of markers in this action is similar to their role during merging having the same benefits.

The usage of Markers in Inserting data operation: As the markers provide the addresses in the underlying storage system, assuming the markers are still updated after sorting operation, the insertion of data, utilizes these addresses for quick writing operation. Usage of splitters and markers for filtering operation: in case we need to filter results (e.g. SQL "where" clause) and our splitters and markers are both valid the operation, they can be used to create sequential storage access for maximizing storage read throughput.

As described above the usage of splitters and markers in for sorting, merging, joining and filtering provide IO minimization of IO load activity in storage subsystem.

This usage has also advantage in further stages: the ability of combining use of splitters and markers to provide results for the next steps in pipelined SQL query execution. Example: when filtering the data and sort the result of filtering. In this case we can filter and output the result with splitters assigned, sorting stage that is following sorts multiple chunks and not waiting for all results to come from filter stage, while sorting markers are assigned and the last merge section can start to execute immediately upon arrive of first chunk since markers are exist The ability to predict the physical data location required by each query, can be used not only for fetching the data, but also for optimizing the schedule of IO operations. Using the markers of data we need to fetch, we can improve the optimal storage access pattern. For analyzing the access pattern we can benefit from the structure of vector architectures of the cache, which is suited for image processing. Given the data addresses required for each query from the long range of addresses on the storage and excluding the list of pages that are possibly cached we can determine the addresses ranges which can be combined to one sequential continuous read operation and what addresses could be fetched in discrete manner.

Figure 8:
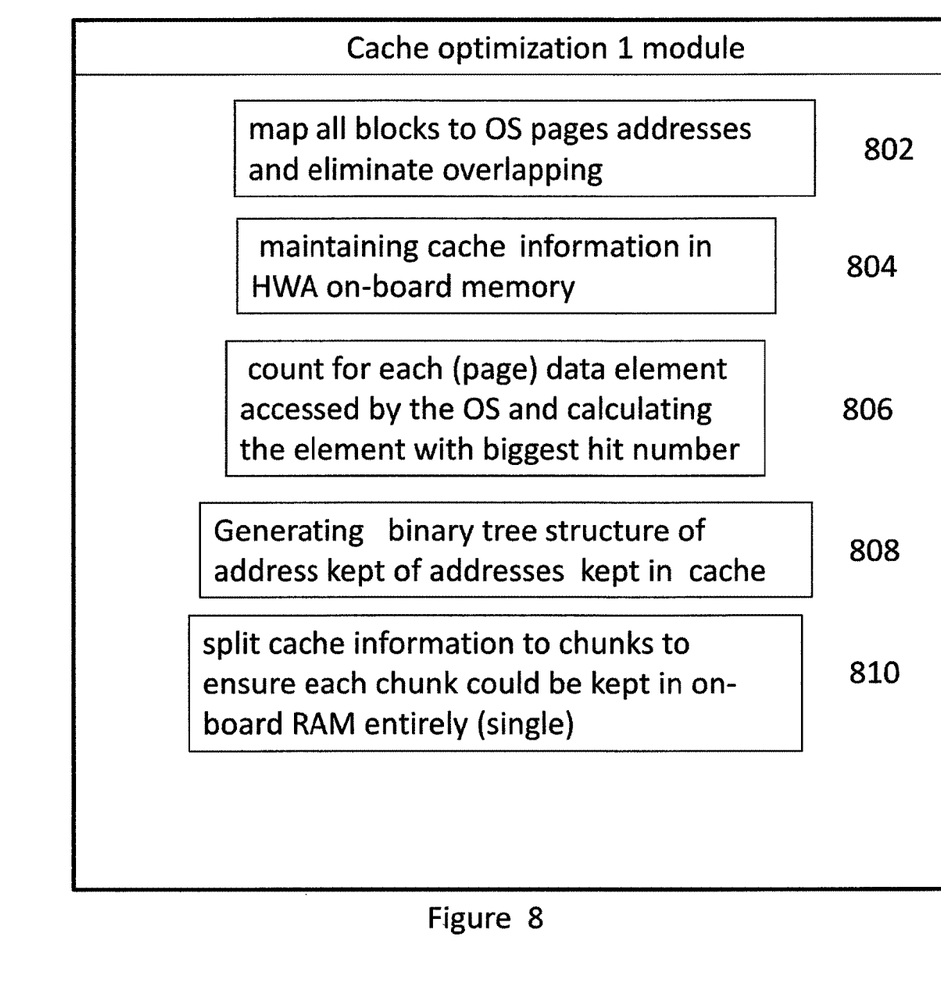
FIG. 8 is a flow diagram of the cache optimization module processing, according to some embodiments of the invention.

FIG. 8 is a flow diagram of the cache optimization module processing, according to some embodiments of the invention. Assuming an array of blocks are waiting to be transferred in/out of the storage and blocks have different sizes and different locations, blocks may potentially overlap. For optimizing the interaction with storage it is suggested to map all cache blocks to OS pages addresses to eliminate overlapping between the blocks (802).

According to some embodiments of the present invention it is suggested to maintain cache information in HWA on-board memory for optimizing cache management including calculating statistics for cache replacement policies (804). For example, utilizing parallel nature of algorithm of the HWA for counting each (page) data element accessed by the OS, enable fast calculation of the elements with large hit number (806).

A further advantage of maintaining cache information in HWA on-board memory is the ability to provide high rate update of the cache usage statistics by Generating binary tree structure of address kept of kept in cache (808), hence enabling to split cache information to chunks, ensuring each chunk could be kept in on-board RAM entirely (810). In this case the chunk retrieval is performed more efficiently by CPU which transfer the chunk is sent to HWA.

Figure 8A:
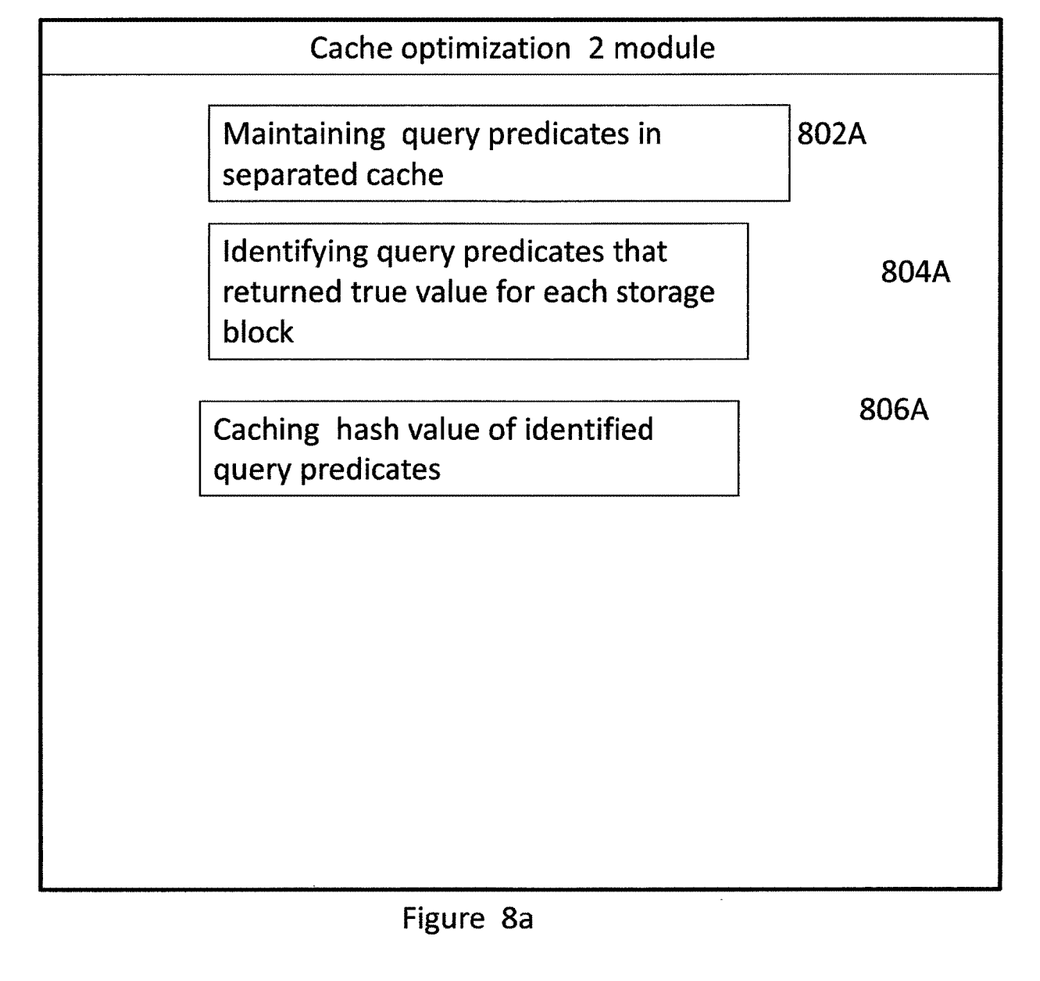
FIG. 8A is a flow diagram of the cache optimization module processing, according to some embodiments of the invention.

FIG. 8A is a flow diagram of the cache optimization module processing, according to some embodiments of the invention. According to some embodiments it is suggested to maintain query predicates in separated cache in the HWA on-board memory (802A) for improving hit/miss ratio. For optimizing block storage it is suggested to identify query predicates that returned true value for each storage block and caching hash value only of identified query predicates (804A, 806A).

For numeric data items, it is not required to use the cache improvement as suggested above in general but using certain types of predicates may have a benefit.

In case of running several simultaneous queries, the system according to the present invention could be easily extended to treat them due to its parallel nature of the HWA units.

Predicates may include two main types: range predicates (p between {X,Y}) and discrete predicates (p=X). Discrete predicates are required only in case of bloom filter false positive. When using GPU units it is suggested to save only hashes (perfect hashes) of predicates due to memory limitations. The hash function can be described as a variation of bloom filter but with single hash function. The hashing of predicate must be perfect/intrusive. By implementing this setup we can allocate only 1 bit for each predicate and thus save additional storage. According to the present invention, the usage of HWA traversing on plurality of saved predicates requires only fraction of time in comparison to CPU performance as known in the prior art.

Cache predicate information could be kept constantly on one or more HWAs to improve responsiveness.

According to some embodiments of the present invention, the system may use local storage or distributed storage architecture. Using Local storage: HWA units resides on the same computing unit machine with the data storage and the markers are simply storage addresses.

Distributed storage and interconnect optimization with HWAs:

The markers structure can be adapted for location on storage and/or execution unit machine. In this case marker may comprise address which identifies the execution unit/machine and its unique ID (e.g.: host IP). Using such storage architecture, may require control distributed data retrieval of plurality of execution units/machines according to markers address and the storage management may be optimized by caching methodologies as described above.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

What is claimed is:

1. A method for controlling and scheduling operation of at least one SQL operator on data chunks using multiple execution units including HWA units and CPU units, said method comprising the step of:
   receiving a SQL query;
   accessing data chunk blocks stored in a centralized single server;
   receiving in real time metadata statistics of raw data itself which is stored in the data chunk blocks stored in the centralized single server, wherein said metadata statistics includes at least one of: statistical analyses using bloom filter, checking chunk boundaries, or frequency moments calculation, said metadata statistics being stored as an off-line copy and being used for splitting data elements into logical chunks;
   assigning splitters based on metadata analysis statistics for dividing all data stored in the data chunks in the data chunk blocks into logic units, and dividing all data stored in the data chunks into the logic units using the assigned splitters enabling sequential access to the data chunks mapped to addresses in an underlying storage system and enabling metadata parsing on heterogenous system;
   predicting query selectivity and result size during execution run-time of the query based on analyzing the real-time received metadata statistics of the raw data itself which is stored in the data chunk blocks stored in the centralized single server;
   choosing at least one of the HWA units to execute each operator of the query based on computational resources and characteristics of the multiple execution units according to the predicted query selectivity and results size; and
   executing operators of the query on the logic units in parallel by at least one of the HWA units using the assigned splitters.

2. The method of claim 1, further comprising the step of setting markers according to identified physical boundaries based on data traversing through a sorting phase for calculating a number of data elements which are required for executing the received query, wherein choosing the at least one of the HWA units further includes checking the calculated number of data elements required for each query.

3. The method of claim 1, wherein the analyzing the received metadata statistics for predicting the query selectivity and result size further includes frequency moments calculation.

4. The method of claim 2, further comprising the step of combining data read and write operations of the received query to determine a schedule of operations for enabling sequential data access to the data chunks based on identified markers based on pattern image of operation vector architecture.

5. The method of claim 1, wherein the metadata statistics are analyzed by the at least one of the HWA units by scanning and filtering the metadata statistics by multiple threads simultaneously, enabling optimized management of storage access.

6. The method of claim 1, wherein a decompression process and the execution of each operator of the query are performed by the chosen at least one of the HWA Units.

7. The method of claim 2, further comprising the step of grouping logical data chunks based on identified markers to enable merging or a join operation of multiple logical groups to be applied simultaneously by multiple threads of at least one of the HWA units.

8. The method of claim 2, further comprising the step of applying a data insert operation utilizing a physical address identified by the markers.

9. The method of claim 2, wherein results of a first query operation are provided to a next query operation in a query pipe line before the first query execution has ended, based on combined splitters and markers data, wherein the first and next query operations are executed in parallel processing.

10. The method of claim 2, wherein the operators of the query comprise a first query operation and a next query operation, and wherein the first query operation is filtering and the next query operation is sorting, wherein the filtering and sorting query operations are combined in real time, and wherein a result output of the filtering query operation, with assigned splitters, are provided to the sorting query operation, such that a start of a sorting query operation occurs while the filtering query operation is still executing, not waiting for all results to come from the filtering query operation.

11. The method of claim 1, further comprising the step of mapping all cache blocks to OS pages addresses to eliminate overlapping between the cache blocks.

12. The method of claim 1, wherein caching information is stored in a HWA on-board memory for optimizing cache management including calculating statistics for cache replacement policies.

13. The method of claim 1, further comprising the step of generating a binary tree structure of addresses stored in a cache, to split cache information into chunks, ensuring each chunk is stored in on-board RAM entirely.

14. A system for controlling and scheduling operation of at least one SQL operator on data chunks using multiple execution units including HWA units and CPU units, said system comprised of:
   a metadata analyzer configured to analyze data chunk blocks stored in a centralized single server and to create real-time metadata statistics of raw data itself which is stored in the data chunk blocks, wherein said metadata statistics includes at least one of: statistical analyses using bloom filter, checking chunk boundaries, or frequency moments calculation, said metadata statistics being stored as an off- line copy and being used for splitting data elements into logical chunks;
   a sputter module that is configured to assign splitters based on the metadata statistics and configured to divide all the data stored in the data chunks into logic units, enabling sequential access to the data chunks mapped to addresses in an underlying storage system and enabling metadata parsing on heterogenous system;

a scheduling module configured to predict query selectivity and result size during execution run-time of a query based on analyzing the real-time metadata statistics of the raw data itself which is stored in the data chunk blocks stored in the centralized single server, and to choose at least one execution device to execute each operator of the query based on its resources according to said predicting and defined splitters including predicted results size and the calculated number of data elements required for the query; and a HWA unit configured to execute operators of the query on the logic units in parallel using the assigned splitters.

15. The system of claim 14, further comprising a sorting module configured to set markers according to identified physical boundaries based on data traversing through a sorting phase for calculating number of data elements of required for the query being executed, wherein the HWA unit is further configured to check a calculated number of data elements required for each query.

16. The system of claim 15, further comprising a join/merge module configured to group logical data chunks based on identified markers to enable a merging or join operation of multiple logical groups to be applied simultaneously by multiple threads of the HWA unit.

17. The system of claim 15, further comprising an inserting module configured to apply a data insert operation utilizing a physical address identified by the markers.

18. The system of claim 14. further comprising a caching module configured to generate a binary tree structure of addresses stored in cache, to split information in the cache into chunks, and configured to store each chunk in an on-board RAM entirely.

* * * * *